July 25, 1967 — J. R. SAUNORIS ETAL — 3,332,376
ROW MAKING DEVICE
Filed June 24, 1965 — 2 Sheets-Sheet 1
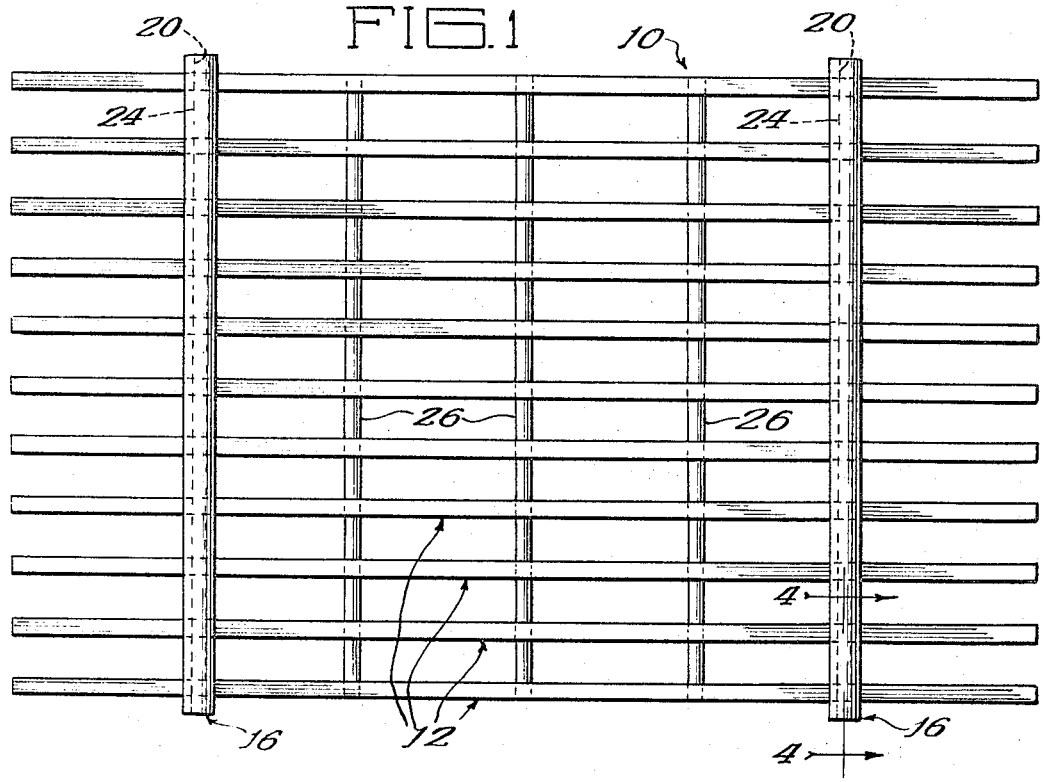
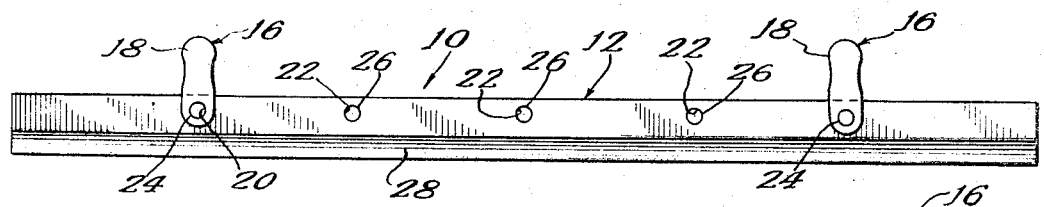
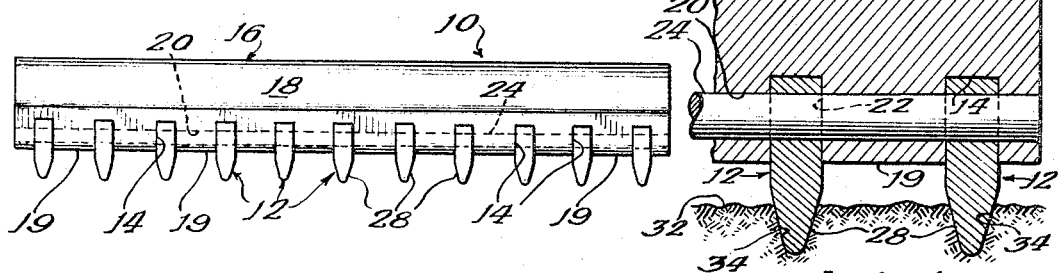
Inventors:
James R. Saunoris
Emil G. Norenberg
By: Hofgren, Wegner, Allen,
Stellman & McCord
Attorneys:

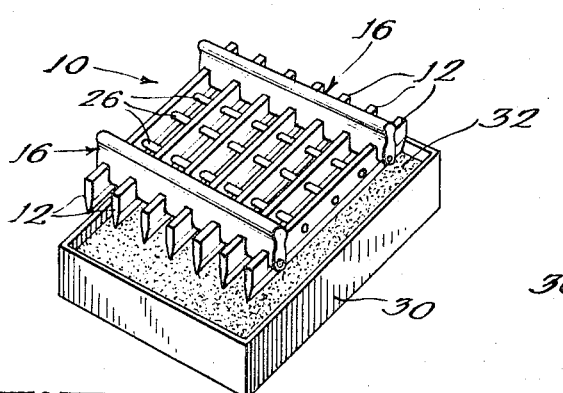
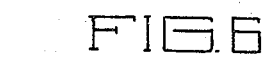
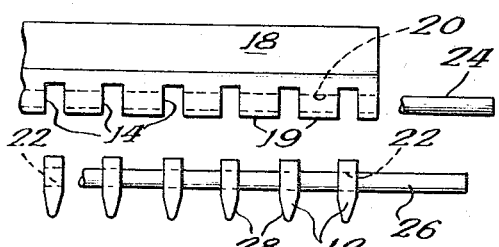
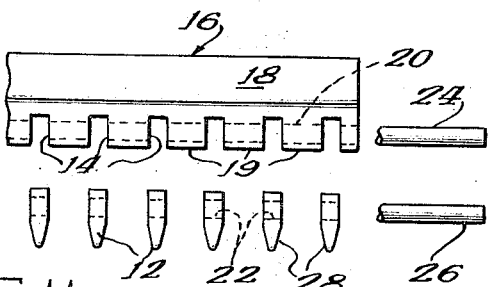
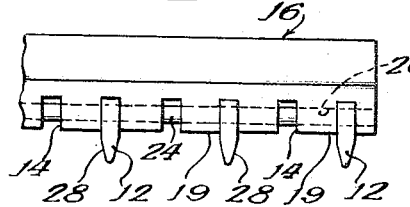
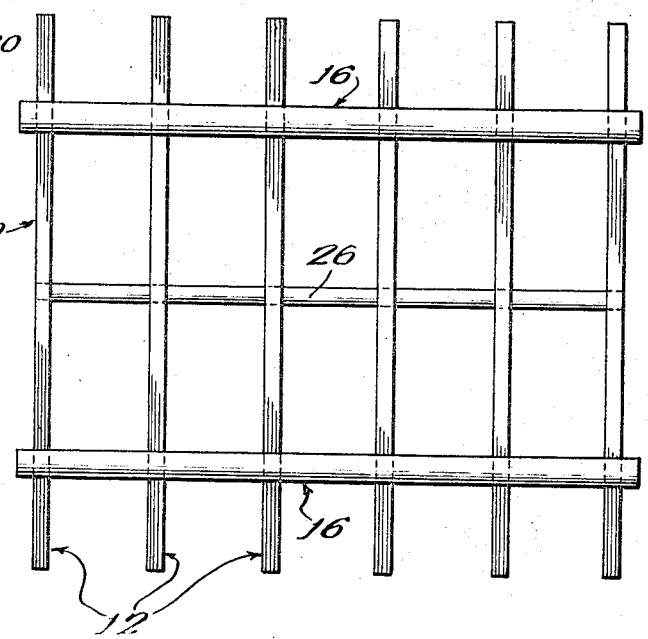
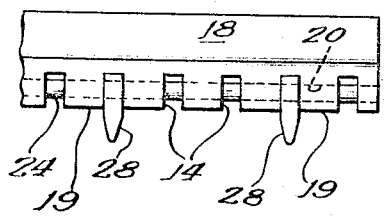

3,332,376
ROW MAKING DEVICE
James R. Saunoris, 6000 W. 111th St., Chicago Ridge, Ill. 60415, and Emil G. Norenberg, 4436 W. 100th, Oak Lawn, Ill. 60453
Filed June 24, 1965, Ser. No. 466,590
5 Claims. (Cl. 111—1)

This invention relates to an apparatus for planting, and more particularly to a device for making rows in seed flats.

Many common flowers or vegetables must first be planted in a box-like container of soil (commonly known as a "flat"). Preferably the flat is kept within a controlled climate, such as within a greenhouse or the like, so that the seedlings may be allowed to grow to a given point of maturity at which time they may be transplanted to a larger soil bed in the greenhouse or in the out-of-doors.

In the past, it has been common to simply broadcast the seed in each flat in a helter-skelter fashion. Some of the disadvantages of broadcast seeding are that it is not uniform so that some plants are crowded and grow rather badly; also, occasionally fungus attacks plants that are arranged too closely and may rapidly spread throughout a flat, not always showing up until an apparently healthy plant is removed from the flat. The seed in the seed flats is relatively expensive, and more recently row planting in seed flats has come into fashion.

Those devices which have been constructed to assist in row planting are relatively expensive and involve sophisticated equipment which is not easily adjustable or easily maintained. Because different types of plants will need different spacing between the rows, it is desirable that the apparatus for forming the rows in the seed flat be easily adjustable to accommodate these different conditions. Furthermore, because the seed used in the seed flats is relatively expensive, and the profit margin is a relatively small percentage of gross receipts from these ventures, the equipment utilized must be relatively inexpensive. Also, such apparatus should be relatively simple to operate so that even the most common greenhouse or nursery attendant can handle the equipment in the proper fashion.

It is therefore the object of this invention to provide a device for making rows in seed flats which is simple to operate, easy to adapt for different planting conditions, economical to produce, and which requires virtually little or no maintenance.

Other objects, features and advantages of the present invention will be apparent from the following description of the preferred embodiments illustrated in the accompanying drawings, in which:

FIGURE 1 is a top plan view of the row making device of this invention;

FIGURE 2 is a side elevational view thereof;

FIGURE 3 is an end elevational view thereof;

FIGURE 4 is a fragmentary enlarged sectional view taken along the line 4—4 of FIGURE 1;

FIGURE 5 is a perspective view showing the row making device of this invention in use in position above a seed flat preparatory to making rows in the seed flat;

FIGURE 6 is a perspective view showing the seed flats after the rows have been impressed therein with the row making device of this invention;

FIGURE 7 is a fragmentary view showing a stage of adjustment of the row spacing of the device of this invention;

FIGURE 8 is a view similar to FIGURE 7 showing another stage in the adjustment of the device of this invention;

FIGURE 9 is a view similar to FIGURES 7 and 8 showing the device of this invention after an adjustment in row spacing has been completed;

FIGURE 10 is a view similar to FIGURE 9 showing the device adjusted to a different row spacing; and FIGURE 11 is a top plan view similar to FIGURE 1 of the device of this invention showing the device adjusted to accommodate a shorter seed flat and produce wider rows therein than with the device as shown in FIGURE 1.

Referring now to the drawings, the row making device 10 of this invention includes a number of laterally spaced, generally longitudinally extending, wedge-shaped runners 12, each of which nests along one edge in cut-out portions or slots or spaces 14 formed in a pair of transversely extending support members 16 which are spaced longitudinally of the runners. Each of the support means 16 includes a generally upstanding handle portion 18 for manual grasping of the device and a plurality of spacer portions 19 which extend radially outwardly from one edge of the handle portion in axial alignment with each other to provide a means for maintaining the runners in lateral alignment and in spaced relationship to each other. The support member 16 is provided with an axially extending bore 20 which extends through the spacer portions 19. Similarly, the runners are provided with aligned openings 22 so that the bars 24 can be advanced through the support members and through the aligned holes in the runners to hold the runners against upright or vertical movement relative to the support members. The runners may be provided with other aligned openings 22 to receive spaced bars or stiffening pins 26 to add rigidity to the frame.

As shown in FIGURES 5 and 6, in use the device is held above a seed flat 30 and then impressed into the surface of the soil 32 of the seed flat so that the wedge-like bottoms 28 of the runners form a shallow, V-shaped, groove or row 34 in the soil. These rows 34 will be evenly spaced from each other for the reception of the desired seed to be planted in the flat and insure that proper spacing between the rows of seeds is maintained.

FIGURES 7 through 11 illustrate how the device of device of this invention may be adjusted to accommodate different planting conditions which may be necessitated by planting different seeds or utilizing the device with seed flats of different sizes. As is to be expected, certain botanical products require more distance between the plants or "leaf room" as the plants mature and grow. Thus it is desirable to spread the seeds in rows which are wider apart than for those plants which require less spacing. The row maker of this invention may be very easily and rapidly adjusted to accommodate changes in row spacing and to insure that, in the adjusted form, the desired row spacing is maintained.

To this end, the bar 24 may be withdrawn from the support means 16, as shown in FIGURE 7, which permits the support means to be separated from the remainder of the structure. Next, the bars 26 may be withdrawn from the several runners so that the device is now completely disassembled as shown in FIGURE 8. At this point, a user may remove those runners 12 which fall within the theoretical bracket of proper spacing between the rows. Assuming, hypothetically, that the user would want to produce rows twice as far apart as is produced with the structure as shown in FIGURES 1 through 4, the user need only remove every other runner 12 and then reassemble the device as shown in FIGURE 9. The notches 14 in the support means 16 still serve to keep the runners substantially parallel to each other and in fixed spaced relationship to each other so that the desired row spacing will be produced when the device is used as shown in FIGURES 5 and 6.

FIGURE 10 illustrates the device modified for use in producing even wider rows with two out of every three of the runners removed so that there is a "two space" separation between the runners.

FIGURE 11 shows even further modification of the device to accommodate smaller sized seed flats and produce wider rows than that shown in FIGURE 1. Here there is only one bar 26 and the support means 16 are positioned in the same areas as the two outside bars 26 were positioned in the device as shown in FIGURE 1. Moreover, the device has been adjusted as substantially shown in FIGURE 10 to produce wider rows. The excess length of the runners may be severed by appropriate means, such as by sawing or the like, so that the structure is adjusted in length for use with smaller seed flats.

This invention provides a means for making accurately spaced rows in seed flats consisting of simply manufactured and assembled parts which may be made of metals, plastics or wood. The simplicity of the structure, in addition to enhancing the economy thereof, further makes it virtually maintenance free and capable of proper use by even the most unskilled personnel. In addition, the device may be easily adjusted so as to be capable of making rows of different widths to provide the necessary environment for different plants to be grown in the rows formed thereby.

The foregoing detailed description has been given for clearness of understanding only, and no unnecessary limitations should be understood therefrom, as some modifications may be obvious to those skiled in the art.

We claim:

1. A device for making seed rows in a soil bed, comprising: a plurality of elongate runners, each having a longitudinally extending edge for impressing a seed row into soil, said runners also having a plurality of longitudinally spaced openings; support means for holding the runners in selected spaced relationship substantially parallel to each other to produce the desired seed row spacing in a given portion of soil, said support means including a handle member extending transversely of the runners, said handle member having a plurality of equidistant spaced notches in one edge of a size and shape to receive the runners, said handle member further including a pin receiving opening extending through the notched portion thereof and a pin removably positioned in said opening and through some of the openings in the several runners for holding the runners in said handle member; and a plurality of generally transversely extending stiffening pins positioned in the axially aligned openings of the runners intermediate the handle members.

2. A device for making seed rows in a soil bed, comprising: a plurality of spaced runners, each having one longitudinally extending edge constructed and arranged to produce a seed row when impressed into the soil; support means for holding the runners in selected spaced relationship to each other to produce the desired seed row spacing in a given portion of soil, said support means including a member extending generally transversely of the runners, said member having a plurality of spaced notches in one edge portion to afford a slot connection with each runner for holding said runners laterally spaced with respect to said member, the edge portion having an axially extending bore in alignment with said notches; and a pin telescopically received in said bore for holding said runners in vertical alignment with respect to each other and said member.

3. The device of claim 2 wherein each of said runners is provided with an opening in alignment with the axial extending bore of said edge portion, and wherein said pin extends through the openings of said runners and the bore of said edge portion to hold the runners in the notches of the edge portion of said member against movement relative thereto.

4. A device for making seed rows in a soil bed, comprising: a plurality of spaced runners, each having one longitudinally extending edge constructed and arranged to produce a seed row when impressed into the soil; support means for holding the runners in selected spaced relationship to each other to produce the desired seed row spacing in a given portion of soil, said support means including a member extending generally transversely of the runners and being adapted to receive an axial extending pin therethrough, the member having a plurality of spaced notches in one edge portion to afford a slot connection with each runner for holding said runners laterally spaced with respect to said member; and a pin extending axially through said member and engaging said runners for holding said runners in assembled relation with said member of the support means.

5. The device of claim 4 wherein the member is provided with an axially extending bore and each of said runners is provided with a pin receiving opening, the openings being positioned in respect to said bore so that the pin extends through said bore and said openings.

References Cited

UNITED STATES PATENTS

| | | | |
|---|---|---|---|
| 1,594,265 | 7/1926 | Johnson | 172—697 X |
| 1,697,572 | 1/1929 | Perham | 172—378 X |

FOREIGN PATENTS

| | | |
|---|---|---|
| 472,374 | 9/1937 | Great Britain. |

ABRAHAM G. STONE, *Primary Examiner.*

ROBERT E. BAGWILL, *Examiner.*